(12) United States Patent
Zhao et al.

(10) Patent No.: US 8,554,274 B2
(45) Date of Patent: Oct. 8, 2013

(54) CELL PHONE PROJECTOR

(75) Inventors: Hui Zhao, Shenzhen (CN); Zhengyue Yan, Shenzhen (CN); Qi Xiao, Shenzhen (CN); Zhijun Chen, Shenzhen (CN); Zheng Li, Shenzhen (CN)

(73) Assignee: Hui Zhao, Shenzhen (CN)

( * ) Notice: Subject to any disclaimer, the term of this patent is extended or adjusted under 35 U.S.C. 154(b) by 27 days.

(21) Appl. No.: 13/334,039

(22) Filed: Dec. 21, 2011

(65) Prior Publication Data

US 2012/0276952 A1   Nov. 1, 2012

(30) Foreign Application Priority Data

Apr. 28, 2011   (CN) ...................... 2011 2 0131467 U

(51) Int. Cl.
*H04M 1/00*   (2006.01)

(52) U.S. Cl.
USPC ...................................... 455/556.1; 455/557

(58) Field of Classification Search
USPC ............................................. 455/556.1, 557
See application file for complete search history.

(56) References Cited

U.S. PATENT DOCUMENTS

2012/0052908 A1* 3/2012 Kao et al. ...................... 455/557

FOREIGN PATENT DOCUMENTS

| CN | 1356841 | 7/2002 |
|---|---|---|
| CN | 101303515 | 11/2008 |

OTHER PUBLICATIONS

International Search Report of PCT/CN2011/001551.

* cited by examiner

*Primary Examiner* — David Q Nguyen

(57) ABSTRACT

The invention provides a cell phone projector including a housing, a circuit device, a power supply, a projector module, wherein the circuit device and the power supply are disposed in the housing, and the projector module is displaced at one end of the housing, and wherein the housing is provided with a fence-type slot for insertion of a cell phone. The cell phone is inserted into the slot to thereby achieve to connect the cell phone with a projector. In use, a video signal within the cell phone can be easily output through the projector, to bring a better visual effect for users, and it is convenient for people to watch the video.

16 Claims, 2 Drawing Sheets

CELL PHONE PROJECTOR

BACKGROUND

1. Technical Field

The present invention generally relates to output electronic devices, and more particularly, to a projector.

2. Description of the Related Art

Popularity of cell phones brings more entertainment for people, now, cell phones are not only limited to have phone calls and send or receive messages, and but also used to watch movies, listen to music and surf on the internet, chat on video. The cell phone with more various functions bring infinite convenience to users. However, during the course of using cell phones, it is inconvenient to allow more people to watch the screen due to smaller size of the screen of the cell phone itself. In addition, the cell phone itself has large power consumption during the curse of playing video, generally, so that a standard battery for the cell phone can not meet the requirement for a long time watching.

At present, the volume of micro-projectors on the market are too large relative to cell phones, and they need a cooling system to ensure work properly due to great heat produced by the micro-projectors.

Therefore, what is needed is to provide a cell phone projector that is convenient to use and meets the requirement for a long time watching.

SUMMARY OF THE INVENTION

The objective of the present invention to provide a cell phone projector designed to solve that how to connect with a projector for the cell phone, and that the cell phone can not meet the requirement for a long time watching due to low power of a standard battery.

The objective of the present invention is solved though the following technical solutions: a cell phone projector is provided, the cell phone includes a housing, a circuit device, a power supply, a projector module, wherein the circuit device and the power supply are disposed in the housing, and the projector module is displaced at one end of the housing, and wherein the housing is provided with a fence-type slot for insertion of a cell phone.

Further, the slot at a bottom end of the housing is equipped with a connector for electrically connecting with a connector at a bottom end of the cell phone.

Further, the projector module is disposed on a left side of a top end of the housing.

Further, a step-shaped notch is defined in a right side of a top end of the housing.

Further, a ventilation hole is defined in a step surface of the notch.

Further, a bottom end of the housing is provided with a power control switch and a data interface thereon.

Further, the housing is provided with a speaker thereon.

Further, the housing is provided with a focal length adjustment gear for matching with the projector module thereon.

Further, the housing is provided with a volume control button thereon.

Further, the housing includes an upper shell and a bottom shell.

Based on the described technical solutions, the cell phone is inserted into the slot to thereby achieve to connect the cell phone with a projector. In use, a video signal within the cell phone can be easily output through the projector, to bring a better visual effect for users, and it is convenient for people to watch the video. Further, a connector inside the slot is connected with the bottom end of the cell phone, and a power supply inside the projector can provide power to the cell phone so as to prolong playing time, thereby avoiding embarrassment of finding a charger due to the failure of electric power. Further, the right side of the top of the housing has the step-shaped notch and the stepped surface of the notch defines the ventilation hole therein so that the projector module is added a ventilation heat-dissipated portion, thereby greatly improving efficiency of the projector module. Specifically, the bottom end of the housing is provided with the power control switch and the data interface so that the cell phone can be easily charged in the absence of sufficient power, and so that the data interface facilitates supplementing power for the projector and other data input. The housing is provided with the speaker for providing an additional volume for the cell phone, thereby making up for inadequate volume of the cell phone. Moreover, the housing is provided with the focal length adjustment gear matching with the projector module, and the volume control button, so that the cell phone projector is easier to be manipulated and controlled.

Other advantages and novel features will become more apparent from the following detailed description of embodiments when taken in conjunction with the accompanying drawings.

BRIEF DESCRIPTION OF THE DRAWINGS

Many aspects of the present cell phone projector can be better understood with reference to the following drawings. The components in the drawings are not necessarily drawn to scale, the emphasis instead being placed upon clearly illustrating the principles of the present cell phone projector.

DETAILED DESCRIPTION OF THE INVENTION

For the purpose of making the present invention, technical solutions and advantages be more clearly understood, the patent application is further described accompanying with the following drawings and embodiments. It should be understood that the present patent application described hereinafter is only used to explain the specific embodiment the present patent application, and is not limited to claim the scope of the present patent application.

Figure 1:
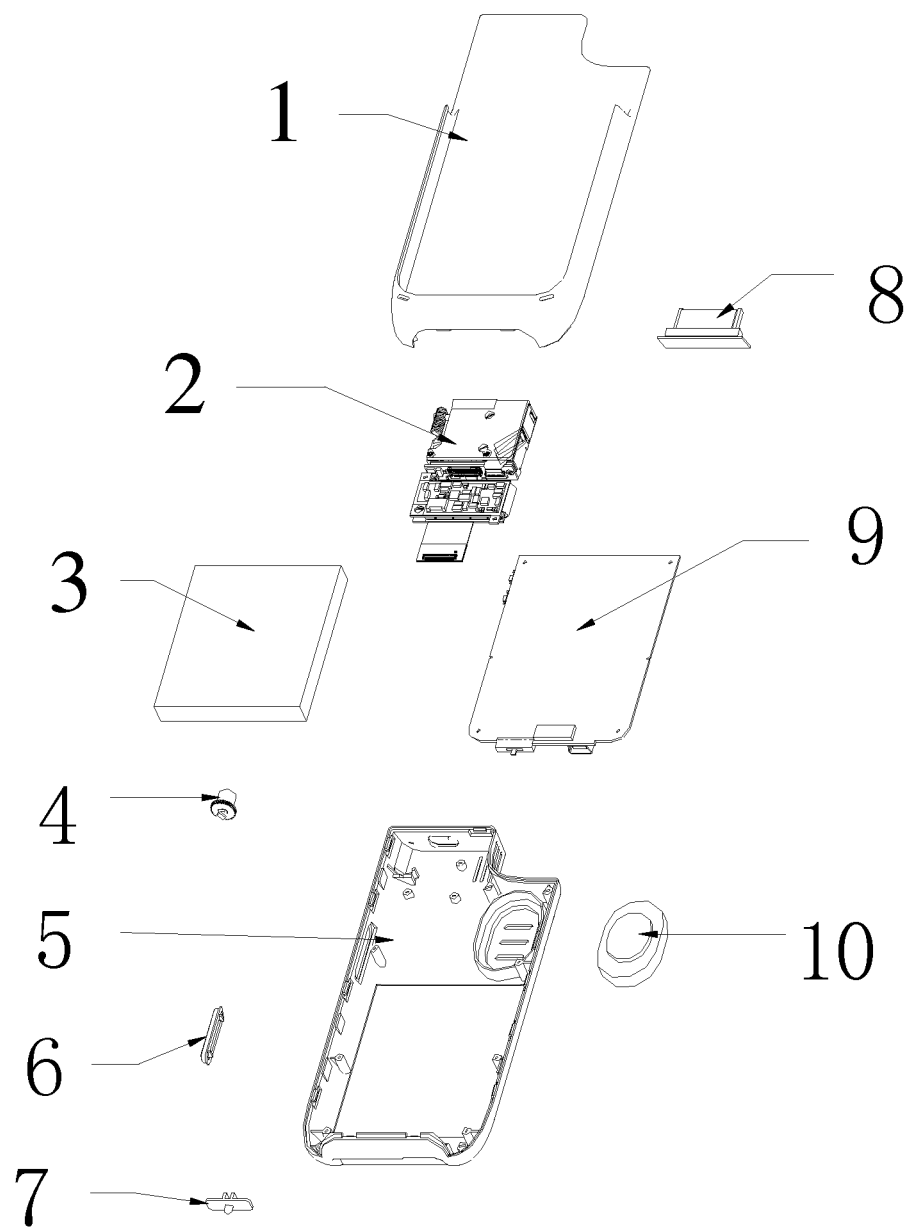
FIG. 1 is an exploded view of a cell phone projector in accordance with a preferred embodiment of the present invention.
Figure 2:
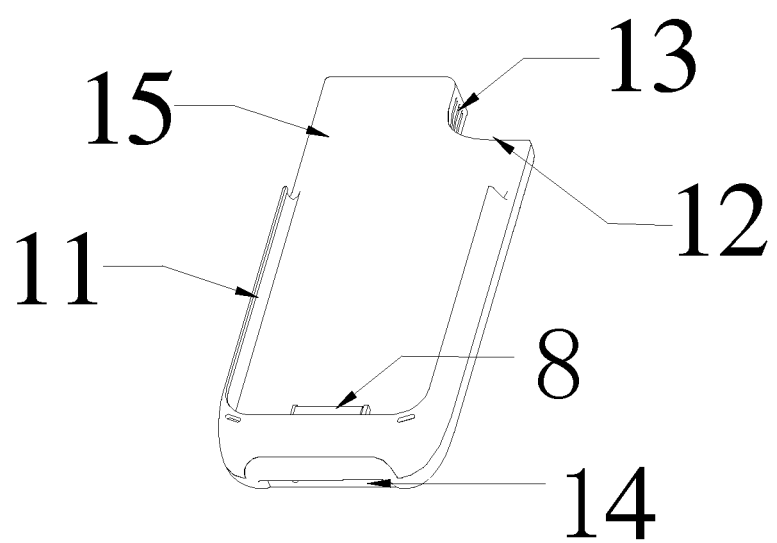
FIG. 2 is a perspective view of the cell phone projector of the embodiment in accordance with the present invention

Referring to FIGS. 1 and 2, an embodiment of the present invention provides a cell projector including a housing 15, a circuit device 9, a power supply 3, and a projector module 2. The circuit device 9 and the power supply 3 are located in the housing 15, and the projector module 2 is disposed at an end of the housing 15. The housing 15 defines a fence-type slot 11 therein for an insertion of a cell phone. The slot 11 at a bottom end of the housing 15 is equipped with a connector for electrically connecting with a connector at a bottom end of the cell phone. The projector module 2 is disposed a left side of a top end of the housing 15, and a step-shaped notch 12 is defined in a right side of the top end of the housing 15. A ventilation hole 13 is defined in a step surface of the notch 12. Specifically, the bottom end of the housing 15 is provided with a power control switch 7 and a data interface 14. The housing 15 is further provided with a speaker 10. The housing 15 is further provided with a focal length adjustment gear 4 matching with the projector module 2. The housing 15 also has a volume control button 6. The housing 15 includes an upper shell 1 and a bottom shell 5.

Based on the described technical solutions, the cell phone is inserted into the slot 11 to thereby achieve to connect the cell phone with a projector. In use, a video signal within the cell phone can be easily output through the projector, to bring a better visual effect for users, and it is convenient for people to watch the video. Further, a connector 8 inside the slot 11 is connected with the bottom end of the cell phone, and a power supply 3 inside the projector can provide power to the cell phone so as to prolong playing time, thereby avoiding embarrassment of finding a charger due to the failure of electric power. Further, the right side of the top of the housing 15 has the step-shaped notch 12 and the stepped surface of the notch 12 defines the ventilation hole 13 therein so that the projector module 2 is added a ventilation heat-dissipated portion, thereby greatly improving efficiency of the projector module 2. Specifically, the bottom end of the housing 15 is provided with the power control switch 7 and the data interface 14 so that the cell phone can be easily charged in the absence of sufficient power, and so that the data interface 14 facilitates supplementing power for the projector and other data input. The housing 15 is provided with the speaker 10 for providing an additional volume for the cell phone, thereby making up for inadequate volume of the cell phone. Moreover, the housing 15 is provided with the focal length adjustment gear 4 matching with the projector module 2, and the volume control button 6, so that the cell phone projector is easier to be manipulated and controlled.

It is believed that the present embodiment and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the present invention.

What is claimed is:

1. A cell phone projector, comprising a housing, a circuit device, a power supply, a projector module, wherein the circuit device and the power supply are disposed in the housing, and the projector module is displaced at one end of the housing, and wherein the housing is provided with a fence-type slot for insertion of a cell phone, and the housing is further provided with a focal length adjustment gear for matching with the projector module thereon.

2. The cell phone projector according to claim 1, wherein the slot at a bottom end of the housing is equipped with a connector for electrically connecting with a connector at a bottom end of the cell phone.

3. The cell phone projector according to claim 1, wherein the projector module is disposed on a left side of a top end of the housing.

4. The cell phone projector according to claim 1, wherein a step-shaped notch is defined in a right side of a top end of the housing.

5. The cell phone projector according to claim 4, wherein a ventilation hole is defined in a step surface of the notch.

6. The cell phone projector according to claim 1, wherein a bottom end of the housing is provided with a power control switch and a data interface thereon.

7. The cell phone projector according to claim 1, wherein the housing is further provided with a speaker thereon.

8. The cell phone projector according to claim 1, wherein the housing is provided with a volume control button thereon.

9. The cell phone projector according to claim 1, wherein the housing comprises an upper shell and a bottom shell.

10. A cell phone projector comprising: a housing, wherein a bottom end of the housing is provided with a power control switch and a data interface thereon; a circuit device; a power supply, wherein the circuit device and the power supply are disposed in the housing; and a projector module displaced at one end of the housing, wherein the housing is provided with a fence-type slot for insertion of a cell phone, and wherein the slot at a bottom end of the housing is equipped with a connector for electrically connecting with a connector at a bottom end of the cell phone, and the housing is further provided with a focal length adjustment gear for matching with the projector module thereon.

11. The cell phone projector according to claim 10, wherein the projector module is disposed on a left side of a top end of the housing.

12. The cell phone projector according to claim 10, wherein a step-shaped notch is defined in a right side of a top end of the housing.

13. The cell phone projector according to claim 12, wherein a ventilation hole is defined in a step surface of the notch.

14. The cell phone projector according to claim 10, wherein the housing is further provided with a speaker thereon.

15. The cell phone projector according to claim 10, wherein the housing is provided with a volume control button thereon.

16. The cell phone projector according to claim 10, wherein the housing comprises an upper shell and a bottom shell.

* * * * *